May 31, 1966 P. J. PLATZER ETAL 3,253,470

FLOW SAMPLING OF CEREAL PRODUCTS AND SIMILAR AGGREGATES

Filed Jan. 6, 1964 2 Sheets-Sheet 1

INVENTORS
PETER J. PLATZER
RICHARD O. SELENSKI
BY
*Whiteley and Caine*
ATTORNEYS INVENTOR.
PETER J. PLATZER
RICHARD O. SELENSKI
BY Whiteley and Caine
ATTORNEYS

United States Patent Office 3,253,470
Patented May 31, 1966

3,253,470
FLOW SAMPLING OF CEREAL PRODUCTS
AND SIMILAR AGGREGATES
Peter J. Platzer, 2201 Essex Road, Minneapolis, Minn.
55426, and Richard O. Selenski, Minneapolis, Minn.;
said Selenski assignor to said Platzer
Filed Jan. 6, 1964, Ser. No. 335,817
11 Claims. (Cl. 73—422)

This application constitutes a continuation-in-part of application Serial No. 86,497, filed February 1, 1961, which was forfeited in favor of this application.

This invention relates to improvements in flow sampling of cereal products and similar aggregates. In general the invention is concerned with the sampling of a flowing body of aggregate by periodically diverting from the stream small amounts thereof which collectively are representative of the full body of aggregate, even though the latter be of a variable nature.

In the merchandising of cereal products, such as grain, the sale price is, in part, dependent upon the quality of the product as determined by a series of tests performed on what purports to be a representative sample of the full mass of the product. It is, therefore, of great importance that the sample selected for analysis be as truly representative as possible of the entire body of the aggregate. While it is a recognized practice to sample static bodies of grain, such as carload lots, by the use of hand operated probe samplers of the type disclosed in Platzer Patent 3,091,968, this method is not appropriate for obtaining representative samples of larger bodies of grain, such as the cargoes of barges or ships or of large grain storage enclosures. Where it is possible to transfer the product from one container to another by means which produce a flowing column, it has been found that periodic samples of the effluent produces a more accurate sample, particularly where vibration may have caused segregation of particles of different size, or in those instances where the larger body of aggregate was not of a uniform character.

In the past, samples of the flowing column were taken by a manual operation that embodied periodically passing an open pouch through the column of flowing material. More recently, mechanical samplers have been developed which employ various forms of tubes that are located within the duct through which the material flows, and which are mechanically actuated to periodically extract a portion of the effluent. Manual sampling is objectionable, because of the lack of uniformity of operation. The prior art mechanical samplers have been found wanting for a number of reasons, among which are that because of their location within the duct, they obstruct the normal flow of the aggregate, and also, these devices do not obtain a uniform sample where the aggregate contains dust. As to the first of these objections, it has been found that the frictional effect of a flowing aggregate, such as grain, will tend to quickly destroy any object in the flow path, and therefore, any sampling device which would tend to obstruct the normal flow will be quickly worn out or rendered ineffective by the frictional effect of the aggregate. It has also been found that unless the sampling device is substantially sealed when it is inoperative, an undue amount of dust is collected in the sample and renders the analysis inaccurate.

Another problem concerned with the accuracy of the sample arises out of the handling of those cereal products that are likely to be damaged by cracking such as corn, oats, barley, or of splitting, such as soya beans. If products of this type are caused to flow against an irregular metal object, such as a sampling tube, some of the particles are damaged or split by contact with the tube, and particularly the edges of the tube, so that the sample may indicate an unduly large proportion of damaged product.

A further problem that has been experienced in the selection of flow samples has been the presence of foreign objects in the product. Grain is frequently shipped in freight cars in which the normal door openings are partially sealed by internal bulkheads or "grain doors" that may be composed of lumber or various forms of heavy cardboard. In rupturing the bulkhead to liberate the grain, fragments of wood or cardboard as well as other foreign objects of unknown origin may be entrained with the grain. When any such object is carried through the duct at the time a sampling tube is extracting a sample, it may act to prevent the proper movement of the tube and thereby destroy the accuracy of the sample.

According to the present invention we have provided a sampling device which acts in conjunction with a generally vertical duct that is conveying aggregate by gravity from one container to another. We have provided a sampling tube which when it is in an inoperative position is located outside of the normal flow path of the product, and is provided with an open outer end that projects substantially parallel with the duct and is periodically moved to an operative position in and across the flow path to receive a sample of the material, and then moved to an inoperative position at one side of the flow path. This is accomplished in a practical manner by having the open outer end of the sampling tube move laterally from a protected area into the duct and thence across the flow path with the outer open end extending generally in opposition to the direction of flow of the aggregate. By locating the sampling tube outside of the normal flow path, it does not obstruct the normal flow of the material, and is therefore not subject to attrition with the material except when the sample is being taken. To prevent the tube from receiving any material when it is in an inoperative position or within the protected area, and particularly to prevent dust from entering the open end of the sampling tube when the latter is inoperative, the said open end thereof must be substantially sealed. To prevent the operation of the sampling tube from being impeded by any foreign objects, a guard or blade is provided to prevent any such foreign object from being wedged behind the reciprocally moving sampling tube. To assure periodic operation of the sampling tube, a suitable motor is connected thereto for producing the lateral movement of the open outer end of the tube relative to the column of flowing material, and preferably some form of timing mechanism is utilized to provide uniform operation.

An object of the invention is to provide an improved mode of sampling a body of aggregate, such as grain or other cereal products, flowing through a confined duct, by periodically passing into the duct from a normally inoperative or protected position outside of the normal flow path, a tube having an open end that projects generally in opposition to the direction of flow to select a sample of the material and then move the tube to its inoperative position and thereby avoid obstructing the normal flow through the duct.

Another object is to provide a mode of selecting a sample of a cereal product in such a manner as to avoid cracking or splitting of particles of the product by the use of a tube whose outer open end is provided with a flexible material.

Another object is to provide a mode of selecting samples that are representative of the material flowing through the duct, but which precludes receiving dust or unwanted particles between the periods when the regular samples are taken.

Another object is to provide a means of effectively sealing the sampling tube when the latter is inoperative.

A further object is to provide a suitable guard that coacts with the sampling tube to exclude foreign objects present in the material from obstructing the normal operation of the sampling tube.

Other and further objects may become apparent from the following specification and claims, and in the appended drawings in which:

Figure 1:
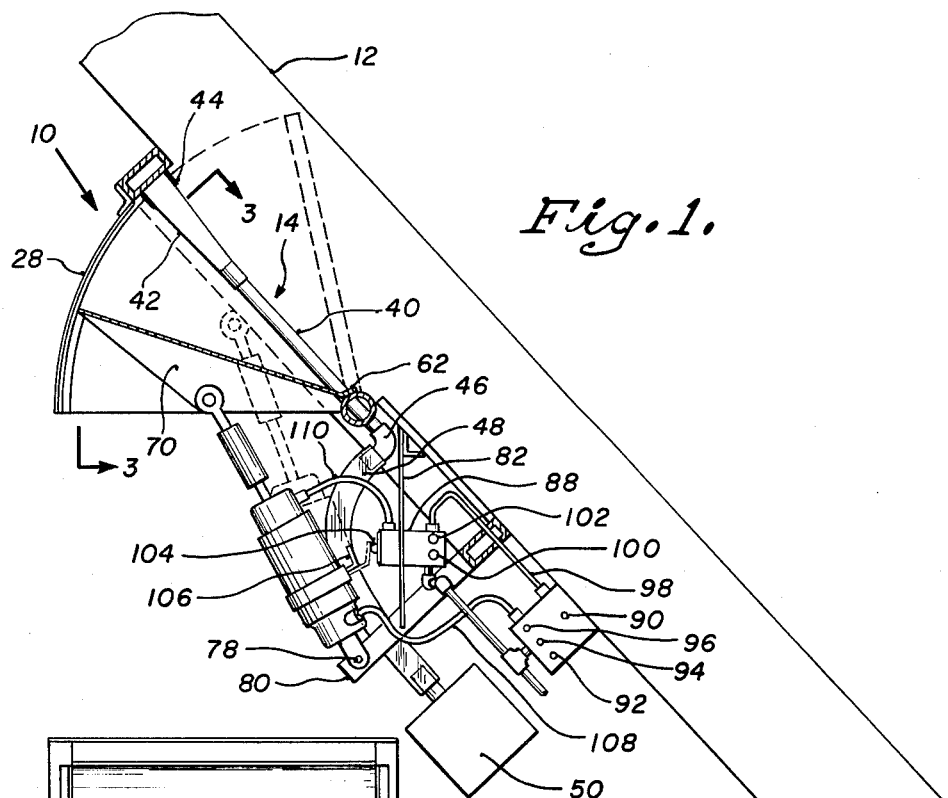
FIG. 1 is a side elevation of a fragmentary portion of a duct with the flow sampler forming the present invention mounted thereon.

Referring now to the several views of the drawing, the invention will be described in detail.

Referring to FIG. 1, general reference numeral 10 indicates in its entirety a sampling device for extracting samples of an aggregate flowing through a confined path, such as duct 12. While the duct 12 is here illustrated in an angularly disposed position, it could be in a vertical position as it serves merely to conduct an aggregate from an upper container, not shown, to a lower container which is also not shown. The duct 12 is formed with a lateral opening 14 about or within which the sampling mechanism 10 is secured.

Figure 4:
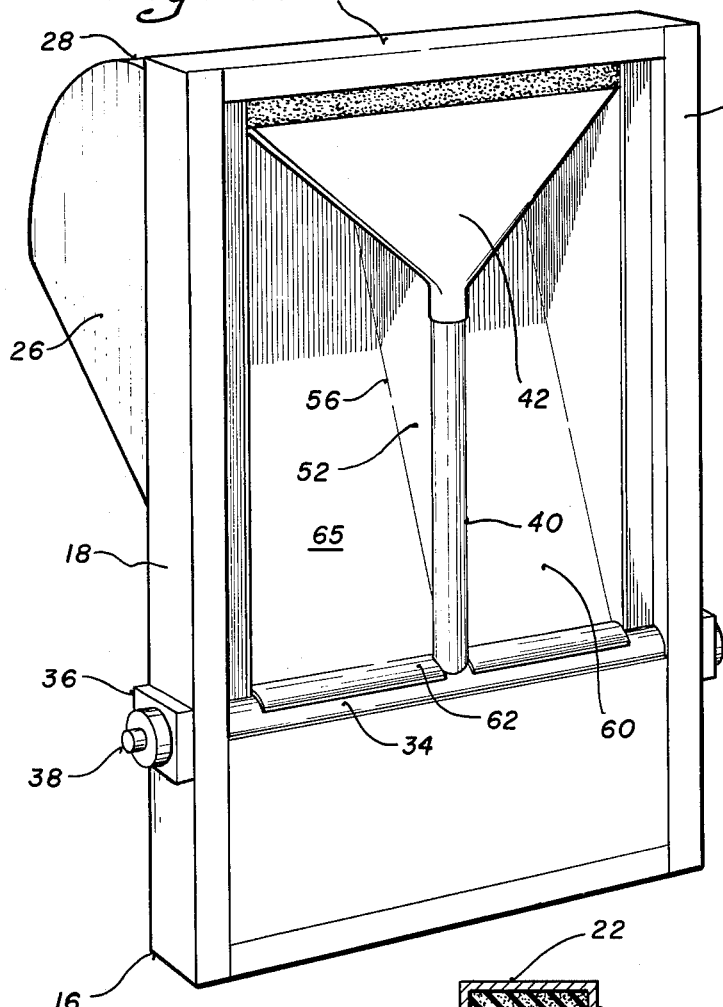
FIG. 4 is a perspective of the front side of the sampler.

As seen in FIG. 4, the sampler is composed of a rigid rectangular frame 16 composed of the several sides 18, 20, 22 and 24. A hood 26 is composed of an arcuate-shaped top cover 28 and lateral side plates 30, 32 are secured on the upper back end of the frame 16. Extending transversely between the lateral parts 18 and 20 of the frame 16 is a supporting member 34 which carries flanges 36 on its outer end that are journaled onto stub shafts 38 to provide axial rotation of the member 34 with respect to the sides 18 and 20 of the frame 16.

Figure 5:
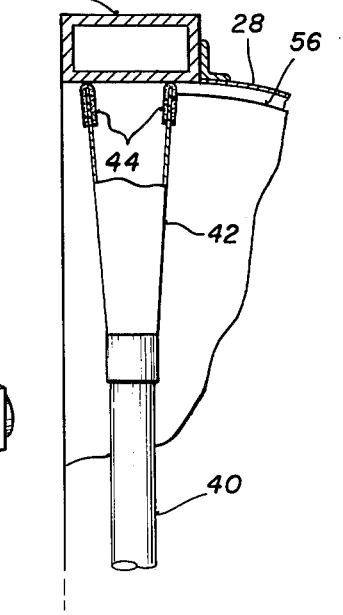
FIG. 5 is sectional detail of a part of the structure shown in FIG. 4.

A sampling tube 40 is carried by the member 34, and its upper end is joined to an open topped funnel 42 that extends laterally between the opposite frame members 18 and 20. As disclosed in FIG. 5, the opposite lips of the funnel 42 are covered by flexible members 44 composed of rubber or the like, which extend in prolongation of the sides of the funnel 42 and resiliently engage the under surface of the frame portion 22 when the tube assembly is located within the frame 16. The lower or inner end of tube 40, as disclosed in FIG. 1 is joined to an elbow 46 which is connected to a flexible tube 48 that extends to a collecting receptacle 50.

In the rear of the tube 40 is a guard structure formed of a segmental shaped piece of metal 52 which at its forward edge 54 is secured to the rear side of the tube 40 above the supporting member 34. Additional segmental guard members 52a and 52b may be utilized, and these members are secured at their upper edges to the lateral extremities of the funnel-shaped member 42, as disclosed in FIGS. 3 and 4. The upper surface 56 of each of the guards 52 is arcuate-shaped to conform to the inner surface of the top 28 of the hood 26. The rear surface 58 of each of the guards 52 is joined to a sheet of metal 60 which at its lower edge 62 is welded to the supporting member 34 as seen in FIG. 4. This assembly as seen in FIG. 4 produces an area designated by reference numeral 65 which is outside of the normal flow path in duct 12. The outer guard members 52a and 52b are engaged on their outer surfaces by a layer of felt or rubber 64 held within brackets disposed on the inner sides of the lateral portions 18 and 20 of frame 16 to form a seal and prevent leakage of the aggregate on movement of the assembled parts, as will be described hereinafter.

Figure 6:
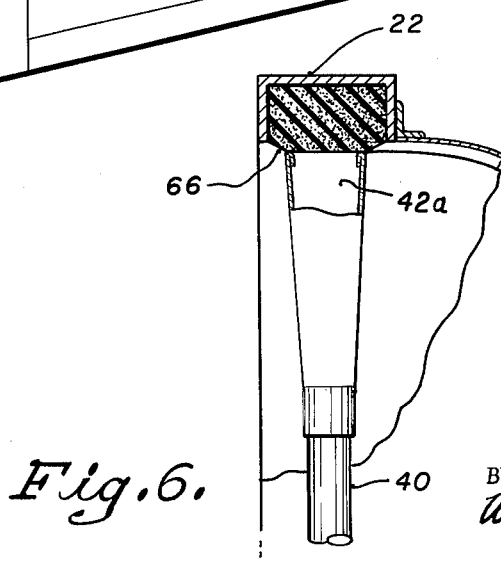
FIG. 6 is a modification of the structure shown in FIG. 5.

It will be recognized that the layers 44 on the outer end of the funnel 42 form a projection of the open ended tube 40, and form a substantial seal with the lower surface of the upper frame member 22, and this is the preferred form of the invention. However, in FIG. 6 a flexible member 66 is carried by the lower surface of frame member 22 and flexibly engages the open end of funnel 42a.

Figures 2, 3:
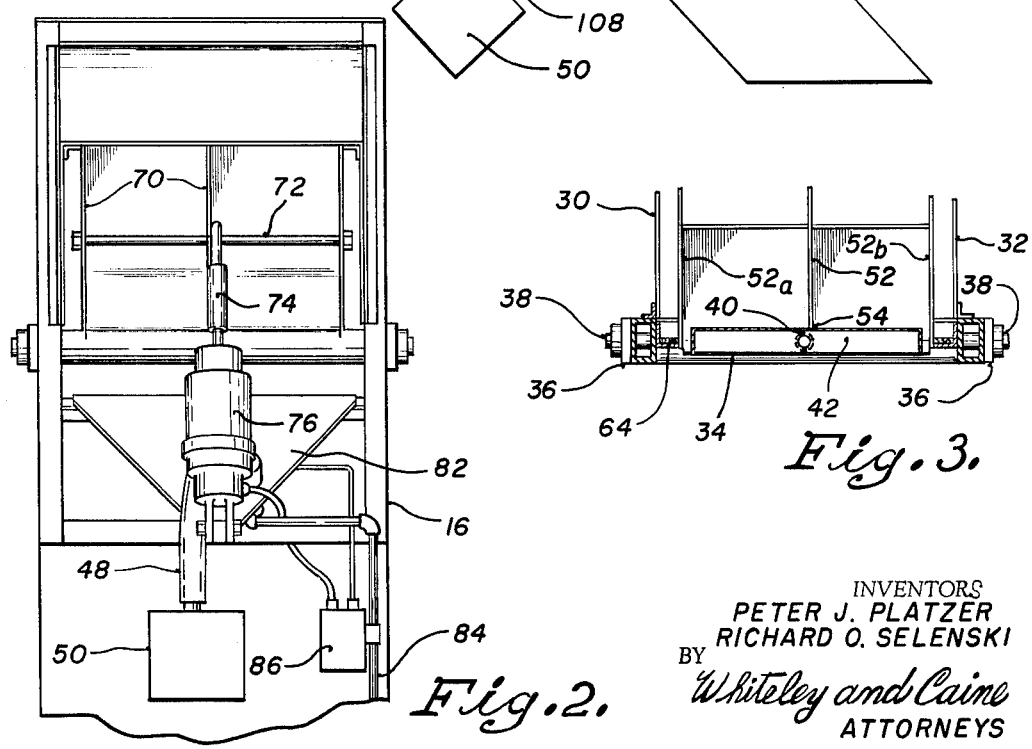
FIG. 2 is a rear view of the sampler as seen from the left hand side of FIG. 1.
FIG. 3 is a fragmentary plan view taken on the lines 3—3 of FIG. 1.

As best seen in FIGS. 1 and 2, on the rear side of member 60 are 3 angular reinforcing members 70, and between these members is a reinforcing bar 72 to which is joined a connecting rod 74 of a piston, not shown, disposed within a cylinder 76, which with the piston forms a motor or driving member for rocking the movable assembly, comprising the tube 40 and associated parts, relative to the frame 16 on the journalling members 36, 38. The lower end of the cylinder 76 is pivotally supported at 78 to a base member 80 that extends rearwardly from the frame 16. Brackets 82 interconnect the base member 80 with the frame 16 to reduce vibration.

The motor, comprising the cylinder 76, and its coacting piston is actuated by a fluid under pressure, such as compressed air. A conduit 84 extends from a source of compressed air and joins a first control 86, and a second control 88, which collectively control the reciprocating movement of the motor. The control 86 comprises a stopcock 90 and three regulating members 92, 94 and 96 which regulate the length of the stroke of the piston, the rate at which the piston is reciprocated and the frequency of movement of the piston. The control 88 is a reversing control and is joined to the control 86 by a conduit 98. The control 88 contains two adjusting members 100 and 102 which regulate the rate of return movement of the piston and the frequency of return movement. The control 88 also has extending from one end thereof a plunger 104, which is adapted to be engaged by an abutment 106 carried by a part of the movable mechanism and illustrated as being mounted on the cylinder 76. The control 86 is connected to one end of cylinder 76 by a conduit 108 and the control 88 is connected to the other end of cylinder 76 by a conduit 110. The controls 86, 88, and all of their coacting parts are conventional devices and form no part of the present invention, beyond their function of controlling the actuation of the motor. Moreover, while the motor is here illustrated as a compressed air motor, it is within the scope of the present invention to use any other form of driving mechanism to reciprocate the sample tube 40 and its coacting parts relative to the interior of duct 12 through the opening 14 thereof.

The operation of the sample will now be described. In the full line disclosure of FIG. 1, the sampler is in its inoperative position with the open end of the funnel 42 within the confines of the inactive area 65, as defined by the frame structure 16, and aided by the resilient sealing means, the tube is therefore substantially sealed. Assuming that an aggregate, such as grain or other cereal products are flowing through the duct 12, such products may be of varying quality, and there may, in fact, be a certain amount of dust or other undesirable materials flowing through the duct. In selecting a sample of the effluent for qualitative analysis, it is essential that the sample be representative of all of the material flowing through the duct, including dust or other undesirable materials. The frequency at which samples are taken, and the amount of the sample to be taken are factors that are controlled by the parts 92, 94, 96, 100 and 102. The controls are adjusted so that with each movement of the motor, the tube 40, bearing the funnel 42, or 42a, travels from the inoperative space 65 outwardly into the duct to the opposite extremity thereof and thence return to the space 65. In this manner, the sample selected will be representative of all of the aggregate flowing through the normal flow path. To energize the motor, the stopcock 90 is opened and air under pressure passes through the control 86 to the lower end of cylinder 76, forcing the piston outwardly to thereby rock the assembly to the dotted line position of FIG. 1. Since the funnel 42 or 42a extends laterally between two extremities of the duct 12, and its movement is controlled so that it extends to an extremity of the duct opposite the opening 14, a full sample, including dust, if any, is selected, whence the tube returns to its inoperative position where it is sealed against entry of material while it is within the space 65.

As some cereal products are subject to damage, if they would come in contact with the edges of the open end of a metal tube, the resilient lips 44 of the funnel 42 prevent this damage, in addition to forming a substantial seal with the lower extremity of the frame portion 22.

During the movement of the tube 40 and funnel 42 into and out of the duct 12, it will not appreciably impede the flow of material but if any large foreign object is descending with the aggregate, the guards 52 will catch the object, if it is of substantial size, and will discharge it back into the duct as the assembly is retracted within the space 65. The plate 60 and the hood structure 26 with the sealing means 64 prevent leakage of any of the aggregate during movement of the sampling tube.

Of particular importance is that when the tube 40 and its funnel 42 are returned to their inoperative position within the space 65, as defined by the frame 16, the aggregate is unimpeded in its flow through the duct 12, whence the tube assembly is not subject to the frictional effect of the aggregate and this will be particularly evident if the duct is disposed in a true vertical plane.

Although the sampler 10 is illustrated and described as being composed of one tube 40 with a single funnel 42, the number of tubes may be increased at will if it is deemed desirable.

The principal advantage of the invention is in the provision of means for taking representative flow samples while minimizing the impedance of the normal flow of material through the duct, and it will be appreciated that the quantity of material actually flowing through the duct may be subject to wide variation.

Another advantage is that by sealing or substantially sealing the open end of the tube while the latter is in its inoperative position, the selected samples will contain proportionate amounts of all of the aggregate including dust if such be present, but that dust or undesired particles will not normally enter the tube while the latter is in its inoperative position within the frame 16.

By providing a funnel which extends throughout the entire width of the duct a representative sample is taken, and by guarding the lips of the funnel with flexible means, the particles of the sample are not damaged by the sampling operation.

It will be obvious to those skilled in the art that my invention may be modified by many substitutions and equivalents, and this disclosure is intended to be illustrative only. Therefore, we intend to be limited only by the scope of the appended claims.

We claim:

1. In combination with a generally vertically disposed duct formed with a lateral opening therein, a member having a relatively flat lower surface extending outwardly from the said duct adjacent the upper limits of the opening therein, a sampling tube formed with an open outer end, and means supporting said tube in a generally parallel relationship with said duct for movement of said tube from an operative position with the open end of said tube within the interior of said duct and generally in confronting relationship to the direction of flow of material through said duct to sample a portion of said material, said means permitting movement of said tube through the opening in said duct to an inoperative position at one side of the material flow path to avoid obstructing the normal flow of material through said duct and with the open end of said tube substantially contiguous to the lower surface of said first named member whereby said first named member substantially precludes entry of material from said duct into said tube.

2. In combination with a generally vertically disposed duct formed with a lateral opening therein, a sampling tube formed with an open outer end, means supporting said tube in a generally parallel relationship with said duct for movement of said tube relative to the opening in said duct between an operative position with the said open end thereof within the interior of said duct and generally in confronting relationship to the direction of flow of material through said duct to sample a portion of said material, and an inoperative position outside of the interior of said duct to avoid obstructing the normal flow of material through said duct, and resilient means carried on the outer open end of said tube acting to reduce the impact of said material with said tube when the latter is in its operative position and also forming a substantial seal between the outer end of said tube and the upper limits of the opening in said duct when said tube is in an inoperative position.

3. In combination with a laterally confining duct constituting a normal gravity flow path for an aggregate, said duct formed with an opening in a lateral surface thereof, a sampling tube formed with an outer open end, means supporting said tube in a generally parallel relationship with said duct for movement of the open end thereof relative to said duct opening and between an operative position within the gravity flow path with the open end of said tube in confronting relationship to the direction of flow to sample a portion of said material and an inoperative position at one side of said flow path, and means for sealing the said open end of said tube when the latter is in its inoperative position.

4. A flow sampling device, comprising a rectangular frame adapted for mounting relative to an opening in a duct, a straight tube formed with an open outer end, journalling means carried by said frame and supporting said tube for rotative movement of the tube to project said open outer end thereof beyond the frame and into the interior of said duct in a direction generally opposite to the direction of flow of material through said duct to sample a portion of the material flowing through said duct, and flexible means carried on the outer open end of said tube which coacts with the upper end of said frame to seal the interior of said tube when the latter is within the confines of said frame.

5. In combination with a duct formed with a generally rectangular opening in a lateral surface thereof, a straight sampling tube formed with an open outer end, journalling means connected to said tube between its opposite ends and supporting said tube outside of the inner limits of said duct in such a manner as to avoid obstructing the normal flow of material through said duct, a driving member operably connected to said tube and adapted to move the outer open end thereof from an inoperative position outside of the interior of said duct and return and generally in confronting relationship to the flow of material through said duct to sample a portion of the material flowing through said duct, and resilient sealing means coacting between the open outer end of said tube and the upper limits of said duct opening to seal the outer end of said tube when the same is in an inoperative position.

6. A flow sampling device, comprising a rectangular frame adapted for mounting in an opening in a duct, a straight tube formed with an open outer end, journalling means carried by said frame supporting said tube between its opposite linear ends for rotative movement of the tube to project said open outer end thereof beyond the frame and into the interior of said duct in a direction generally opposite to the direction of flow of material through said duct to sample a portion of the material flowing through said duct, a driving member operatively connected to said tube in such a manner as to produce reciprocal movement of said open outer end thereof, and flexible sealing means coacting between the said open outer end of said tube and the upper end of said frame to seal the interior of said tube when the latter is within the confines of said frame.

7. In combination with a duct formed with an opening in a lateral surface thereof, a tube supported between its opposite ends for pivotal movement of one end thereof through said opening and into the interior of the duct and in a direction generally in opposition to the direction of flow of material through said duct, a driving member operatively connected to said tube in such a manner as to move the outer end thereof between opposing lateral limits of said duct, and a guard member positioned adjacent the upper end of the tube and operative with said tube and trailing the same and movable into the duct to engage any obstruction matter passing through the duct which would normally impede the reverse movement of said tube relative to the duct.

8. In combination with a duct formed with an opening in a lateral surface thereof, a tube supported between its opposite ends for pivotal movement of one end thereof through said opening and into the interior of the duct and having an opening for sampling in a direction generally in opposition to the direction of flow of material through said duct, a driving member operatively connected to said tube in such a manner as to move the outer end thereof between opposing lateral limits of said duct, and a blade-like member operatively connected to said tube at least along the upper end thereof and directed toward the surface with the opening and movable with the tube into the duct and of sufficient extent to engage any obstructing matter passing through the duct between the moved tube and the opening which would normally impede the movement of said tube relative to the duct.

9. In combination with a generally vertically disposed duct, a sample diverting tube formed with an open outer end, means supporting said tube in a generally parallel relationship with said duct for movement of said open end of said tube through the entire cross-sectional area of said duct and generally in confronting relationship to the direction of flow of material through said duct to sample a representative portion of material flowing through said area, said means permitting movement of said tube to an inoperative position entirely to one side of the material flow path to avoid obstructing the normal flow of material therethrough, and resilient means carried by said tube on said outer open end thereof acting to reduce the impact of said material with said tube when the latter is in its operative position and also acting to substantially seal said tube when the latter is in its inoperative position.

10. In combination with a laterally confining duct forming a normal gravity flow path for an aggregate, a sample diverting tube formed with an open outer end of a dimension sufficient to extend across one dimension of said flow path, means supporting said tube in a generally parallel relationship with said duct for movement of said open end of said tube through the entire cross-sectional area of said flow path with the open thereof in confronting relationship to the direction of flow of material through said flow path, said means permitting movement of said tube to an inoperative position entirely to one side of said flow path to avoid obstruction thereof, resilient members carried by said tube on said outer open end thereof acting to reduce the impact of said material with said tube when the latter is in its operative position, and means coacting with said resilient members to substantially seal said tube when the latter is in its inoperative position.

11. In combination with a generally vertically disposed duct forming a normal gravity flow path for cereal products and similar aggregates, a sampling device embodying a casing adapted for connection with said duct, a sample diverting tube formed with an open outer end, means supporting said tube within said casing in a generally parallel relationship with said duct for movement of said open end of said tube through said flow path generally in confronting relationship to the direction of flow of cereal products, said means permitting movement of said tube to an inoperative position at one side of said flow path, the improvement consisting of resilient means carried by said tube in surrounding relationship with the open outer end thereof acting to reduce the impact of cereal products with said tube when the latter is disposed in the flow path and also coacting with a portion of said casing to substantially seal the open end of said tube when the latter is in an inoperative position at one side of said flow path.

References Cited by the Examiner

UNITED STATES PATENTS

| | | | |
|---|---|---|---|
| 1,494,855 | 5/1924 | MacMichael | 73—422 |
| 1,966,712 | 7/1934 | Fisher et al. | 73—422 |
| 3,000,219 | 9/1961 | De Boalt | 73—422 |

RICHARD C. QUEISSER, *Examiner.*

LOUIS R. PRINCE, *Primary Examiner.*